May 26, 1970  F. HACKER  3,514,151

TRANSPORT VEHICLE

Filed Oct. 24, 1967  2 Sheets-Sheet 1

Inventor:
FRITZ HACKER

BY: Craig & Antonelli
ATTORNEYS

United States Patent Office 3,514,151
Patented May 26, 1970

3,514,151
TRANSPORT VEHICLE
Fritz Hacker, Ludwigsburg-Ossweil, Germany, assignor to Firma Dr.-Ing. h.c.F. Porsche KG, Stuttgart-Zuffenhausen, Germany
Filed Oct. 24, 1967, Ser. No. 677,586
Claims priority, application Germany, Nov. 24, 1966, 1,580,567
Int. Cl. B60p 3/24
U.S. Cl. 296—39                    9 Claims

ABSTRACT OF THE DISCLOSURE

A transport vehicle for carrying non-deformable as well as liquid, pulverulent, or similar flowable materials. The vehicle body has side walls defining a loading space and having attached thereto a collapsible container for holding flowable materials. The container is collapsible against the side walls and may be covered by cover plates so that the loading space may be filled with non-deformable material.

BACKGROUND OF THE INVENTION

In order to transport non-deformable as well as liquid goods by means of the same vehicle, particularly trucks, it is conventional to provide tanks between the axles underneath the loading floor. Such a vehicle is designed to cover some of the expenses of the otherwise uneconomical return trip by carrying liquid goods in the tanks. However, an economical transportation of liquid materials is impossible or seriously jeopardized with such a vehicle, because the tanks have only a limited capacity because of the relatively small space available between the axles of the vehicle. Also, such a vehicle has a restricted ground clearance due to the tanks, which is a disadvantage, particularly in the case of cross country vehicles. Also, the unloaded weight of the vehicle is substantially increased because the tanks must have a particularly thick walled construction due to their unprotected and exposed location.

It is known to manufacture the fuel tanks of racing vehicles, airplanes, or the like, from flexible material. However, the utilization of such flexible tanks merely exploits the otherwise wasted broken-up spaces of the vehicles by accommodating fuel.

SUMMARY OF THE INVENTION

It is an object of the present invention to overcome the above-mentioned disadvantages and provide for the economical transportation of non-deformable, as well as liquid goods. Additionally, it is an object of the present invention to provide a vehicle that may be adapted to the transportation of the above-mentioned different types of goods rapidly and at any time without the use of additional auxiliary means or equipment.

The above is accomplished, according to the present invention, by providing a vehicle with a loading space defined by solid walls, and a flexible or foldable material container within the loading space, preferably a rubber- or plastic-textile combined or bonded material. The container is preferably connected to at least one of the walls of the loading space, and may have a box-shaped construction. With such a container, it is possible to exploit the entire carrying capacity of the loading space of the vehicle for the transportation of liquids or other flowable goods, so that the vehicle may be employed for the transportation of substantially any type of goods. With the container accommodated within the interior of the vehicle, it is protected from outside damage by the walls of the loading space, which is a particular advantage in military supply vehicles.

Detachable fasteners are preferably provided for connecting the container to the wall or walls of the loading space. For example, snap buttons, hooks or the like may be employed to detachably connect the container to the wall or walls. Thus, the vehicle may be rapidly converted, without additional auxiliary means, from transporting non-deformable goods to transporting liquid or similar flowable goods, or vice versa. It is particularly advantageous to provide link members extending between opposite portions of the walls of the container to insure a sufficient stability of the container shape perpendicular to the side walls to which it is attached, particularly when the container is filled. In the collapsed or folded position of the container, it is covered by cover plates, screens, or the like hingedly connected to the walls of the loading space. These plates or screens will maintain the container in its folded position and also safely protect the container from any mechanical damage by the non-deformable conveyed material carried in the loading space.

BRIEF DESCRIPTION OF THE DRAWING

Further objects, features and advantages of the present invention will become more clear from the following description of the drawing, wherein.

DETAILED DESCRIPTION OF THE DRAWING

Figure 1:
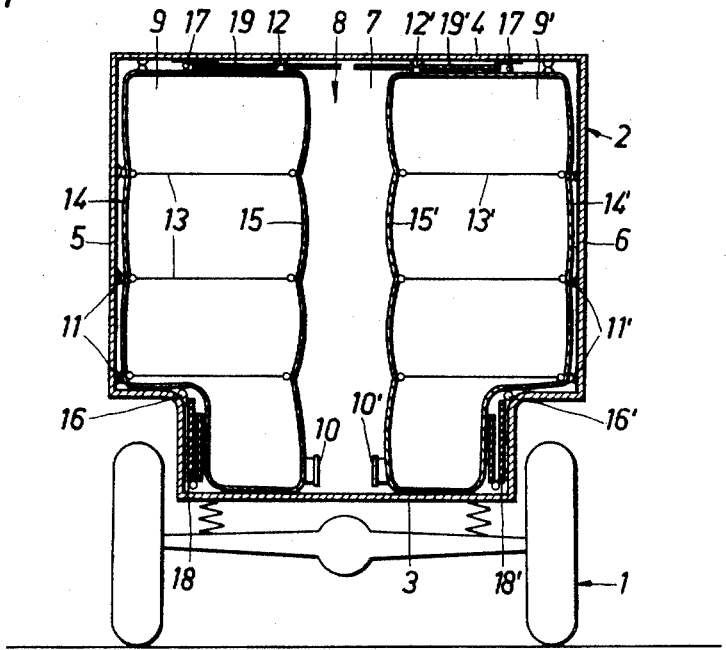
FIG. 1 is a transverse cross sectional view through a vehicle employing the features of the present invention for the conveyance of liquid, pulverulent, or similar flowable materials.

The automotive vehicle 1 is provided with a box-shaped superstructure 2. The superstructure 2 is formed substantially by a floor 3, a ceiling or roof 4, side walls, 5, 6, front wall 7, and a rear wall (not shown in the drawing), which rear wall is preferably provided with a loading gate. The superstructure 2 defines a loading space 8 wherein containers 9 and 9' are accommodated. The containers 9 and 9' are provided with inlet and discharge openings 10, 10', respectively. The containers 9, 9' are detachably mounted by means of snap buttons 11 and 11', or the like, respectively, to the side walls 5 and 6, respectively, and, in the operative position or extended position, by snap buttons 12, 12', respectively, to the roof 4 of the superstructure 2. Cover plates 19, 19' are provided with apertures B in the zone of the snap buttons 12, 12', thus making it possible for the snap button parts attached to the roof 4 and those attached to the containers 9, 9' to freely cooperate with each other. Ropes or other link member 13 and 13' are disposed in the interior of the containers 9 and 9', respectively. The ropes 13 and 13' connect the walls 14 and 14', respectively, at regular spacings with the opposed walls 15 and 15' of the containers 9 and 9', respectively.

Figure 2:
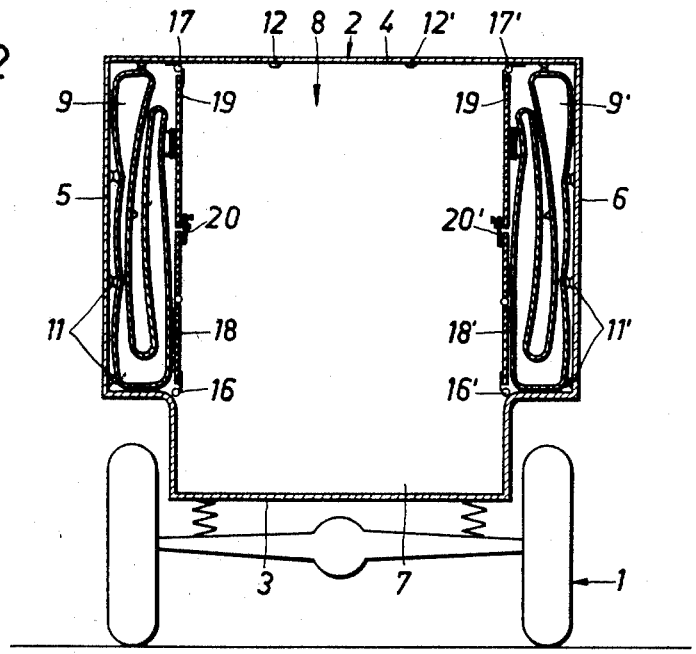
FIG. 2 is a transverse cross sectional view taken through the vehicle according to FIG. 1, where the vehicle has been converted for transporting non-deformable goods, that is materials of a stable shape.
Figure 3:
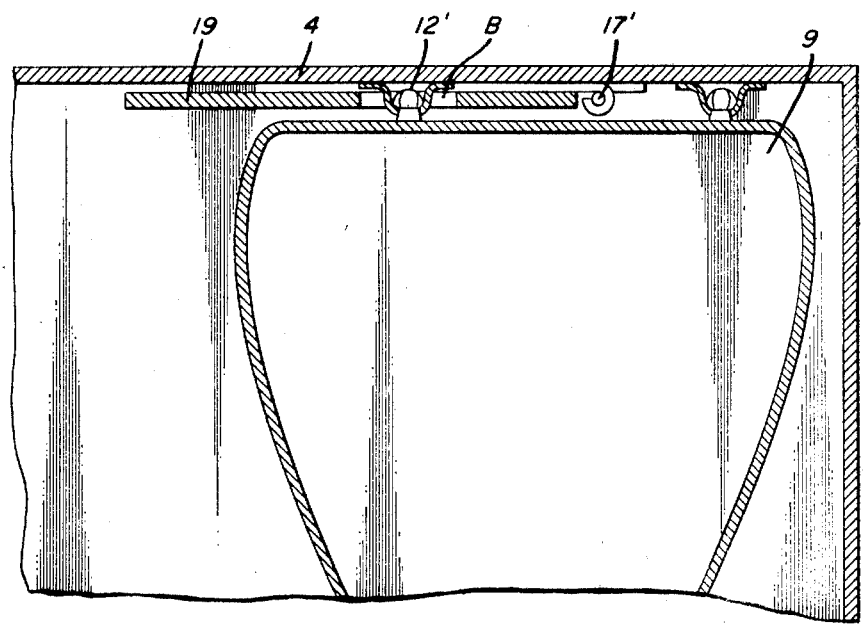
FIG. 3 is a partial transverse cross-sectional view taken through the vehicle according to FIG. 1, showing, on an enlarged scale, how the snap buttons are engaged through apertures in the cover plates.

Cover plates or screens or grates 18, 18' and 19, 19' are connected by means of hinges 16, 16' and 17, 17' to the side walls 5, 6 and to the roof 4, respectively, of the superstructure 2. The cover plates or screens 18, 18' and 19, 19' are moved into aligned position after the container has been collapsed and folded as shown in FIG. 2, and are held in this position by means of the latches 20, 20'.

The foregoing specifically illustrated preferred embodiment to the present invention is by way of example only and not restrictive with respect to the broader aspects of the present invention. For example, the walls 15, 15' of the containers 9, 9' may be reinforced by means of a honeycomb structure or by rib-type subdivisions in the manner of air mattresses, so that the above-described connecting ropes 13 may be omitted or supplemented. Furthermore, the containers may have other desired configurations, and the accommodations of the containers is not limited to vehicle superstructures which are closed on all sides.

Further modifications, variations and embodiments are contemplated within the spirit and scope of the present invention as defined by the following claims.

I claim:

1. A vehicle for transporting non-deformable, as well as liquid, pulverulent, or similar flowable materials, comprising a vehicle body having side walls and a roof defining a loading space; a flexible collapsible container securely attached to one of said walls for expansion into said loading space; a plurality of readily detachable fastener means for securing said container to said one wall and said roof; expansion limiting link means within said container for connecting two opposite walls of said container; and cover plate means for covering said container in its collapsed position and separating said container from the remaining major portion of said loading space.

2. The vehicle according to claim 1, including a second container being a substantial mirror image to said first-mentioned container and being securely mounted on another of said side walls opposite from said one wall.

3. The vehicle according to claim 1, wherein said one side wall includes a first vertical portion and a second vertical portion outwardly spaced a substantial horizontal distance from said first vertical portion; said container being collapsible into a position against said second vertical portion completely outwardly of the vertical plane containing said first vertical portion; said cover means being movable into a closed position forming a vertical extension of said first vertical portion and being co-extensive with respect to said second vertical portion.

4. The vehicle according to claim 3 wherein said cover means includes an upper cover portion hingedly mounted to said roof for movement between a position parallel to said roof and perpendicular to said roof, and a second lower cover portion hingedly connected to said first vertical portion being spaced vertically lower than said second vertical portion for movement between a position parallel and spaced from said first vertical portion and a position co-extensive with said first vertical wall portion; said cover portions including latch means for securely locking them together in their co-extensive position.

5. The vehicle according to claim 4, wherein said body includes a floor partially defining said loading space; said container extending substantially the entire vertical distance between said roof and said floor in its extended position; said container having a filling and discharge member at its lower portion in its extended position; said container extending substantialy the entire longitudinal dimension of said loading space; said container having a depending portion in its extended position for extending parallel and adjacent to said first vertical portion and engaging said floor; said first mentioned container and said second container filling the major portion of said loading space in their extended positions.

6. The vehicle according to claim 1, wherein said one side wall includes a first vertical portion and a second vertical portion outwardly spaced a substantial horizontal distance from said first vertical portion; said container being collapsible into a position against said second vertical portion completely outwardly of the vertical plane containing said first vertical portion; said cover means being movable into a closed position forming a vertical extension of said first vertical portion and being co-extensive with respect to said second vertical portion.

7. The vehicle according to claim 6, wherein said cover means includes an upper cover portion hingedly mounted to said roof for movement between a position parallel to said roof and perpendicular to said roof, and a second lower cover portion hingedly connected to said first vertical portion for movement between a position parallel and spaced from said first vertical portion and a position co-extensive with said first vertical wall portion; said cover portions including latch means for securely locking them together in their co-extensive position.

8. The vehicle according to claim 6, including a second container being a substantial mirror image to said first-mentioned container and being securely mounted on another of said side walls opposite from said one wall.

9. The vehicle according to claim 8, wherein said body includes a floor partially defining said loading space; said container extending substantially the entire vertical distance between said roof and said floor in its extended position; said container having a filling and discharge member at its lower portion in its extended position; said container extending substantially the entire longitudinal dimension of said loading space; said container having a depending portion in its extended position for extending parallel and adjacent to said first vertical portion and engaging said floor; said first mentioned container and said second container filling the major portion of said loading space in their extended positions.

References Cited

UNITED STATES PATENTS

| | | | |
|---|---|---|---|
| 1,519,941 | 12/1924 | Sobeck. | |
| 2,712,797 | 7/1955 | Woehrle | 296—39 |
| 2,723,862 | 11/1955 | Dalglish | 280—5 |
| 2,764,950 | 10/1956 | Finnell | 105—369 |
| 3,025,073 | 3/1962 | Hickman | 280—5 |
| 3,112,845 | 12/1963 | Bryant | 222—129 |
| 3,222,099 | 12/1965 | Swallert | 296—10 |

LEO FRIAGLIA, Primary Examiner

U.S. Cl. X.R.

105—367, 423; 220—22; 222—107; 280—5